Sept. 6, 1955
F. K. H. NALLINGER
2,717,045
HEATING AND COOLING SYSTEM FOR VEHICLE
PASSENGER AND BATTERY COMPARTMENTS
Filed Nov. 9, 1950
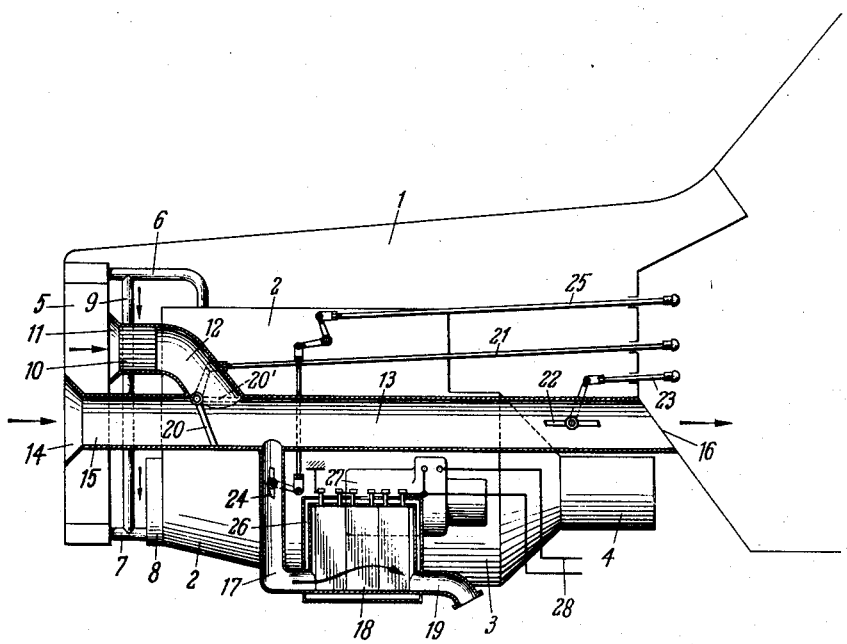
Inventor
Friedrich K.H. Nallinger
By Dicke and Padlon
Attorneys

United States Patent Office 2,717,045
Patented Sept. 6, 1955

2,717,045

HEATING AND COOLING SYSTEM FOR VEHICLE PASSENGER AND BATTERY COMPARTMENTS

Friedrich K. H. Nallinger, Stuttgart, Germany, assignor to Daimler-Benz Aktiengesellschaft, Stuttgart-Unterturkheim, Germany Application November 9, 1950, Serial No. 194,848
In Germany September 28, 1949

Public Law 619, August 23, 1954
Patent expires September 28, 1969

3 Claims. (Cl. 180—1)

This invention relates to an arrangement of the electric battery in vehicles and particularly in passenger cars.

It is one object of the present invention to provide an improved efficiency and an increased durability of the battery.

Another object of the present invention is to provide for a complete independence of the operation of the battery from the ambient temperature conditions and in particular in the case of the external atmosphere being too cold or too warm.

A further object of the present invention is to provide for immediate full performance of the battery even after a prolonged exposure of the vehicle to low external temperatures so that starting of the vehicle internal combustion engine will be facilitated under such climatic conditions.

A further object of the present invention is to protect the battery against too high temperatures, above all in summer.

A further object of the present invention is to improve the climatic conditions of the battery by simple means operating, if desired automatically, in dependence upon the actual heating and ventilating conditions of the interior of the vehicle.

A still further object of the present invention relates to a convenient and loss economizing arrangement of the battery with relation to the engine and its starter respectively.

Still another object of the present invention is an arrangement of the battery which prevents contamination of the air in the interior of the vehicle by the acid vapors produced by the battery.

All of these objects are substantially based on the following considerations.

It has been found that the accommodation of the battery in the engine compartment of the motor vehicle is unfavorable in summer because of the heat radiation of the engine while on the other hand this heat radiation has a favorable effect on the battery in winter. The accommodation of the battery in another place of the vehicle than in the engine compartment is particularly disadvantageous in winter for starting purposes. Furthermore, the battery has a considerably reduced capacity in winter owing to its low temperature.

The provision of a conditioning system according to the invention permits proper maintenance of the battery both in summer and in winter at a substantially constant temperature which ensures a uniform favorable operation of the same. If the conditioning system operates while depending upon the heating and ventilating system of the interior of the vehicle, such as obtained in winter, when the passenger compartment of the vehicle receives a supply of air heated by the engine by means of a heat exchanger, then the battery is also correspondingly heated. If, however, during the summer fresh air is caused by the head-wind to enter the interior of the vehicle for ventilating purposes, then simultaneously a correspondingly favorable cooling of the battery is effected. The location of the battery in a branch of the main stream of fresh air in this case implies the advantage that the main stream of fresh air will not be contaminated by acid vapors or the like in case the battery leaks.

Owing to the conditioning of the ambient air, the battery may be kept at a substantially constant temperature, both during the summer and the winter, which provides most favorable conditions for the life, capacity and efficiency of the battery.

It has proved to be particularly advantageous further to provide for relatively short leads between battery and starter to minimize loss of voltage and to facilitate starting. Placing the battery in the vicinity of the starter, however, exposes the former to a considerable degree of heat radiation of the engine. In that case conditioning or control of the ambient air is of high importance for the battery and in particular also for the ventilation and cooling of the latter. Further, it is important to arrange the battery in such a manner as to provide heat insulation therefor, for instance in a heat insulating casing. This gives not only efficient protection to the battery from the heat radiation of the engine but also permits on the other hand to keep the battery still warm after a prolonged non-use of the vehicle even for whole days at external temperatures below zero.

Other objects of the invention will become apparent from the following specification by reference to the accompanying drawings.

In the drawing one preferred form of embodiment of the invention is diagrammatically illustrated as associated with a fresh air heating system for the interior of the vehicle. Below the engine hood 1 there are located the engine 2, the flywheel housing 3 and the gear box 4. The radiator 5 arranged ahead of the engine is supplied with warm cooling water through a pipe 6. The re-cooled cooling water is fed back to the engine 2 through a pipe 7 and the cooling water pump 8. Interconnected in a branch pipe 9 there is a heat exchange device 10 in which the fresh air entering at 11, for instance behind the radiator 5, is warmed up by the cooling water, whereupon it is fed through a pipe 12 into the main pipe 13. Provision is made, further, to withdraw fresh unheated air in front from the head-wind which conveniently by-passes under the radiator 5 and enters through intake member 14 into a pipe 15 which unites with the pipe 12 to form a common main pipe 13. The pipe 13 discharges at 16 into the leg room for the driver or at any other suitable place into the passenger compartment of the vehicle. The pipe 13 branches off into a relatively small pipe 17 for conveying air past the battery 18 of the vehicle whereupon it is discharged through a discharge port 19, directly into the external atmosphere.

At the point where the pipes 12 and 15 unite control means are provided such as a change-over flap 20 which may be actuated by a control linkage 21 from the driver's seat so as to shut off line 15 in one of the end positions 20, shown in the drawing in full lines.. In the other end position 20', shown in the drawing in dotted lines the pipe 12 is shut off. The fresh air in these two end positions is permitted to flow only through one or the other of these two pipes 12 or 15. In the former case, for instance in winter, the air is passed through the heat exchange device 10 and accordingly delivered in a heated condition into the interior of the vehicle and to the battery. In the other case, for instance in summer, the heat exchange device is cut off so that only cool fresh air is permitted to enter through the pipe 15 into the pipe 13 and thus into the interior of the vehicle and to the battery. By adjusting the flap 20 to an intermediate position, the two supplies of cold and warm air may be mixed as desired.

In order to permit cutting off heating and ventilating of the interior of the vehicle, a further control member 22, such as a throttle actuating linkage 23 may be provided. In the same manner a corresponding control member 24 may be provided in the pipe 17 which is operated by the linkage 25 and which permits control of the temperature of the air flowing past the battery or to disconnect the air supply to the battery independently of the heating and ventilating condition of the interior of the vehicle. The battery 18 is preferably accommodated in a heat insulated, double-walled container 26, the hollow walls of which may be filled with special heat insulating material, through which container the heated or fresh air supplied by the pipe 17 may be passed. The arrangement according to the invention further provides that the battery is located in the vicinity of the starter 27 so that only a very short cable 28 connecting battery and starter will be necessary.

It is to be understood that the invention is not limited to the particular construction and arrangement of parts of the illustrated embodiment of the invention.

What I claim is:

1. In a motor vehicle, a radiator, admission and discharge lines communicating with said radiator for the circulation of a coolant therethrough, a by-pass duct connecting said lines, a battery, a heat insulating housing surrounding said battery and provided with an air discharge port, a main air line having a fresh air intake mouth, a branch line connecting said main air line to said housing for the purpose of air-conditioning the latter, a hot air line having an air intake mouth and being connected to said main air line, a heat exchanger inserted in said by-pass duct and associated with said hot air line to heat the air flowing therethrough, means in said main air line for selectively shutting off either said fresh air intake mouth or said hot air line, means in said branch line for optionally closing the latter, said main air line leading to the passenger compartment, a valve located in said main air line, and means connected to said valve for operating the latter to thereby optionally interrupt the communication of said main air line with said passenger compartment by said valve.

2. In a motor vehicle, a cooling system for the vehicle engine including a radiator and admission and discharge lines communicating with said radiator for the circulation of a coolant therethrough, a battery, a heat insulating housing surrounding said battery and provided with an air discharge port, a main air line leading to the passenger compartment of the vehicle and having a fresh air intake mouth, a branch line connecting said main air line to said housing for the purpose of air-conditioning the latter, means including a heat exchanger operatively connected with said cooling system for heating air flowing through said main air line, means in said main air line for selectively connecting and disconnecting said last-mentioned means for heating air with said main air line, means in said branch line for optionally closing the latter, and means in said main air line for optionally interrupting the flow of air from said main air line to said passenger compartment.

3. In a motor vehicle, a cooling system including lines for the circulation of a coolant therethrough, a battery, a heat insulating housing surrounding said battery and provided with an air discharge port, a main air line having a fresh air intake mouth, a branch line connecting said main air line to said housing for the purpose of air-conditioning the latter, a hot air line having an air intake mouth and being connected to said main air line, a heat exchanger inserted in said circulation lines and associated with said hot air line to heat the air flowing therethrough, means in said main air line for selectively shutting off either said fresh air intake mouth or said hot air line, means in said branch line for optionally closing the latter, said main air line leading to the passenger compartment, a valve located in said main air line, and means connected to said valve for operating the latter to thereby optionally interrupt the communication of said main air line with said passenger compartment by said valve.

References Cited in the file of this patent

UNITED STATES PATENTS

| Number | Name | Date |
|---|---|---|
| 1,357,598 | Thompson | Nov. 2, 1920 |
| 2,104,765 | Saunders | Jan. 11, 1938 |
| 2,104,769 | Saunders | Jan. 11, 1938 |
| 2,104,771 | Saunders | Jan. 11, 1938 |
| 2,104,773 | Saunders | Jan. 11, 1938 |
| 2,133,577 | Saunders | Oct. 18, 1938 |
| 2,405,144 | Holthouse | Aug. 6, 1946 |
| 2,430,759 | Crise | Nov. 11, 1947 |
| 2,435,277 | Holthouse | Feb. 3, 1948 |
| 2,440,369 | Furman | Apr. 27, 1948 |
| 2,445,392 | Findley | July 20, 1948 |
| 2,523,145 | Robinson | Sept. 19, 1950 |
| 2,552,641 | Morrison | May 15, 1951 |